Patented Mar. 6, 1928.

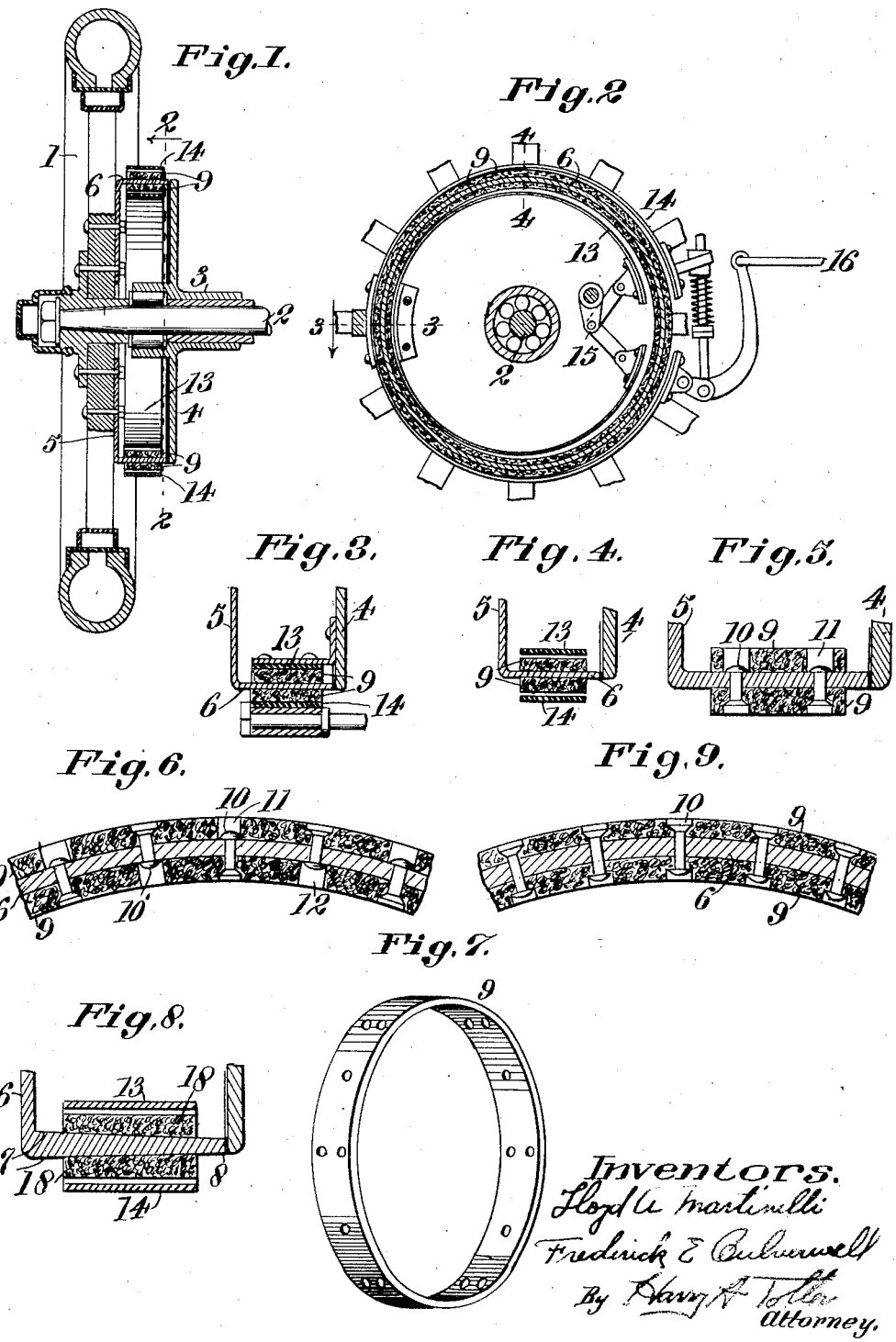

1,661,435

UNITED STATES PATENT OFFICE.

LLOYD A. MARTINELLI AND FREDERICK EDWARD CULVERWELL, OF SAN FRANCISCO, CALIFORNIA.

VEHICLE BRAKE CONSTRUCTION.

Application filed February 25, 1926. Serial No. 90,472.

This invention relates to improvements in vehicle brake construction and more particularly to the positioning of the brake lining, enabling a greater efficiency to be obtained from the brakes than is possible by present constructions.

The invention consists primarily in applying the brake lining to the movable member of the brake structure rather than to the shoe or band. It further consists in providing a brake lining or friction surface, constructed in such manner, that the same will extend entirely over the surface of the movable element to which it is applied.

The objects of this invention are primarily, by attaching the brake lining or friction surface to the movable element of the brake structure, to overcome the vibration in the movable element or drum which sets up what is termed a squeak when the brakes are applied. A further object is to provide a greater increase in effective brake area than is possible by the present application of the brake lining or surface, by securing the lining or brake surface to the movable element to insure a uniform wearing of the lining; to provide a structure wherein the cooling of the lining or brake surface is facilitated, due to the same being in contant motion when the vehicle is travelling, and to provide a structure wherein the relining of the brake structure is facilitated and without requiring the removal of the bands or shoes, their bending or adjustment during the application of the lining.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings, disclosing the preferred embodiment of the invention—

Fig. 1 is a view in vertical section of a vehicle brake structure applied to one of the vehicle wheels.

Fig. 2 is a vertical section on line 2—2 Fig. 1, viewed in the direction of the arrow.

Fig. 3 is a transverse sectional view on line 3—3 Fig. 2.

Fig. 4 is a transverse sectional view on line 4—4 Fig. 2.

Fig. 5 is an enlarged cross sectional view illustrating one form of attachment of the lining on the inner and outer surface of the drum.

Fig. 6 is a longitudinal sectional view of a portion of the brake drum illustrating the manner of independently attaching the exterior and interior brake linings to the surface of the drum.

Fig. 7 is a view in perspective of a brake lining in the form of an annulus.

Fig. 8 is a view in detail of a modified form of brake drum and lining illustrating a structure wherein the surfaces of the brake drum taper towards its free edge, admitting of the positioning of a lining transversely tapered.

Fig. 9 is a view similar to Fig. 6, disclosing the same securing rivets attaching the inner and outer linings to the drum.

In the several views of the drawings, wherein like characters of reference are employed—1 indicates a vehicle wheel removably mounted on a shaft 2 extending through a conventional axle housing 3. In this disclosure, the axle housing is conventionally flanged at 4 and the wheel 1 mounts a brake drum 5 which is secured thereto to rotate therewith. The drum 5 is flanged at 6, the flange extending to a point approximately in contact with the flange 4 of the member 3, as illustrated in the drawings.

In Figs. 1 to 6 the flange 6 is illustrated with parallel sides or faces and in Fig. 8 the flange is illustrated with inclined faces or surfaces 7 tapering toward the free edge 8 of the flange.

In the present invention, the prevailing practice as to the mounting of the brake lining is reversed, and a lining is illustrated annular in form, one positioned co-extension with the respective inner and outer faces of the brake drum flange 6. These linings 9 are preferably independently secured in position by the respective rivets 10, the rivets for holding the inner lining passing through recesses 11 in the outer lining and the rivets 10' for retaining the outer lining passing through recesses 12 in the inner lining; this construction being adapted to enable, when desirable, the changing or renewing of one brake lining without disturbing the other. While the linings 9 are illustrated each as a continuous annulus, it is to be understood that the same may be formed of a strip of material positioned with its surface in contact with the surface of the drum flange and with its ends in meeting relation, just so long as a continuous lining surface is provided on the face of the drum flange. Co-operating with each lining is a brake element, in the present disclosure the same being conventionally illustrated as an inner brake band 13 and an outer brake band 14, the former being capable of expansion by the operation of the toggle members 15, and the latter of being contracted by the operating means 16, of any conventional construction.

It will be observed that in this present structure, the elements 13 and 14, illustrated in the form of flexible bands, are without linings, and are capable when moved into operative position, of readily conforming to the configuration of the lining surface to afford a maximum effective brake area.

In Fig. 8, the tapering of the flange as at 7 enables the employment of linings 18 of annular structure, which are tapered transversely, and such tapering of the respective surfaces enables the quick fitting of the linings relative to their respective flanged faces, without the necessity of stretching the same or of forcing the lining's edge beneath or above the flanged surface, as the case may be, it being observed that the linings are positioned with the thinnest edge inwardly, thereby affording a clearance between the inner edge and the outer edge of the respective flange surface.

In Fig. 9 a single set of rivets is employed for securing the inner and outer linings to the drum.

When applying or renewing one or more linings, it is only necessary to remove the wheel, at which time access may be had to the drum for replacement of the linings. The wheel is then re-mounted and the linings are disposed between the inner and outer brake elements, thus the curvature of the brake elements or bands is in no way changed by the removal of old or the application of new lining. The mounting of the lining on the drum flange insures the rapid radiation of heat, due to the fact that the drum carrying the lining is rotating, which is the reverse of the present practice; also that such rotation will tend to dislodge particles of foreign material which may find access between the brake elements and linings. The lining of the drum rather than the element faces overcomes all liability of the objectionable brake squeak, as the lining affords a deadening element, and prevents the ringing or setting up of rapid vibration in the arm flange, which experience has demonstrated causes objectionable squeaky brakes.

While we have illustrated this invention in connection with the drum of a vehicle wheel, it is to be understood that the same is equally as well adapted for use in connection with brake drums on shafts and the like.

We claim:—

1. In combination with a driving shaft, a brake flange, brake linings disposed circumferentially of the inner and outer faces of the flange and detachably secured thereto to rotate therewith, and means for independently attaching the respective linings to the brake flange, the respective attaching means for one of said linings being accessible through an aperture in the opposite lining.

2. In combination with a flanged brake drum, brake linings disposed circumferentially of the inner and outer faces of the drum, and independent means passing through the respective linings and the drum for independently securing said linings to the drum, each of said linings being provided with openings admitting of access to one end of the securing means for the other lining.

In testimony whereof we have signed our names to this specification.

LLOYD A. MARTINELLI.
FREDERICK EDWARD CULVERWELL.